US008224878B2

(12) United States Patent
Moon

(10) Patent No.: US 8,224,878 B2
(45) Date of Patent: Jul. 17, 2012

(54) APPARATUS AND METHOD FOR MANAGING CONTENT DATA USING CONTENT DATA INFORMATION IN AN INFORMATION TERMINAL

(75) Inventor: Byoung-Seoup Moon, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 400 days.

(21) Appl. No.: 11/098,691

(22) Filed: Apr. 4, 2005

(65) Prior Publication Data

US 2006/0085382 A1 Apr. 20, 2006

(30) Foreign Application Priority Data

Oct. 18, 2004 (KR) .................. 10-2004-0083207

(51) Int. Cl.
*G06F 7/00* (2006.01)
(52) U.S. Cl. ....................... 707/822; 707/830
(58) Field of Classification Search ............. 707/104.1, 707/1, 3, 101, 822, 830
See application file for complete search history.

(56) References Cited

U.S. PATENT DOCUMENTS

| 5,731,813 | A  | * | 3/1998 | O'Rourke et al. ............ 715/810 |
| 6,408,301 | B1 | * | 6/2002 | Patton et al. ................. 707/102 |
| 6,629,104 | B1 | * | 9/2003 | Parulski et al. .............. 707/102 |
| 7,010,144 | B1 | * | 3/2006 | Davis et al. .................. 382/100 |
| 7,409,405 | B1 | * | 8/2008 | Masinter et al. ............. 707/102 |
| 2002/0046224 | A1 | * | 4/2002 | Bendik ............................ 707/522 |
| 2002/0059210 | A1 | * | 5/2002 | Makus et al. ...................... 707/3 |
| 2002/0078239 | A1 | * | 6/2002 | Howard et al. ................ 709/245 |
| 2002/0143797 | A1 | * | 10/2002 | Zhang et al. ................... 707/200 |
| 2004/0078383 | A1 | * | 4/2004 | Mercer et al. ................. 707/102 |
| 2004/0125144 | A1 |   | 7/2004 | Yoon |
| 2004/0201752 | A1 | * | 10/2004 | Parulski et al. ........... 348/231.99 |
| 2005/0050043 | A1 | * | 3/2005 | Pyhalammi et al. ............. 707/6 |
| 2005/0071378 | A1 | * | 3/2005 | Smith ............................ 707/200 |
| 2005/0135341 | A1 |   | 6/2005 | Kim |
| 2005/0187943 | A1 | * | 8/2005 | Finke-Anlauff et al. ..... 707/100 |
| 2005/0246375 | A1 | * | 11/2005 | Manders et al. ........... 707/104.1 |
| 2005/0246640 | A1 | * | 11/2005 | Lacy ............................. 715/713 |
| 2005/0289133 | A1 | * | 12/2005 | Arrouye et al. ................... 707/4 |
| 2006/0004787 | A1 | * | 1/2006 | Borthakur et al. ............ 707/100 |
| 2006/0010148 | A1 | * | 1/2006 | Sattler et al. ................. 707/101 |
| 2007/0025589 | A1 | * | 2/2007 | Okamoto et al. ............. 382/100 |
| 2007/0130190 | A1 | * | 6/2007 | Yoshikawa .................... 707/102 |

FOREIGN PATENT DOCUMENTS

| KR | 1020030022804 |   | 3/2003 |
| KR | 1020030042255 | A | 5/2003 |
| KR | 1020040060018 | A | 7/2004 |
| KR | 1020050062849 | A | 6/2005 |
| WO | WO 01/93108 | A2 | 12/2001 |

* cited by examiner

*Primary Examiner* — Amy Ng
(74) *Attorney, Agent, or Firm* — The Farrell Law Firm, P.C.

(57) ABSTRACT

Disclosed is an apparatus and method for managing content data in an information terminal. Content data information corresponding to content data is stored in a content information database (DB). Whenever an application requests content data information, a content manager provides the application with index information of content data. Then, the application accesses the content information DB and reads content data information corresponding to the provided index information.

25 Claims, 9 Drawing Sheets

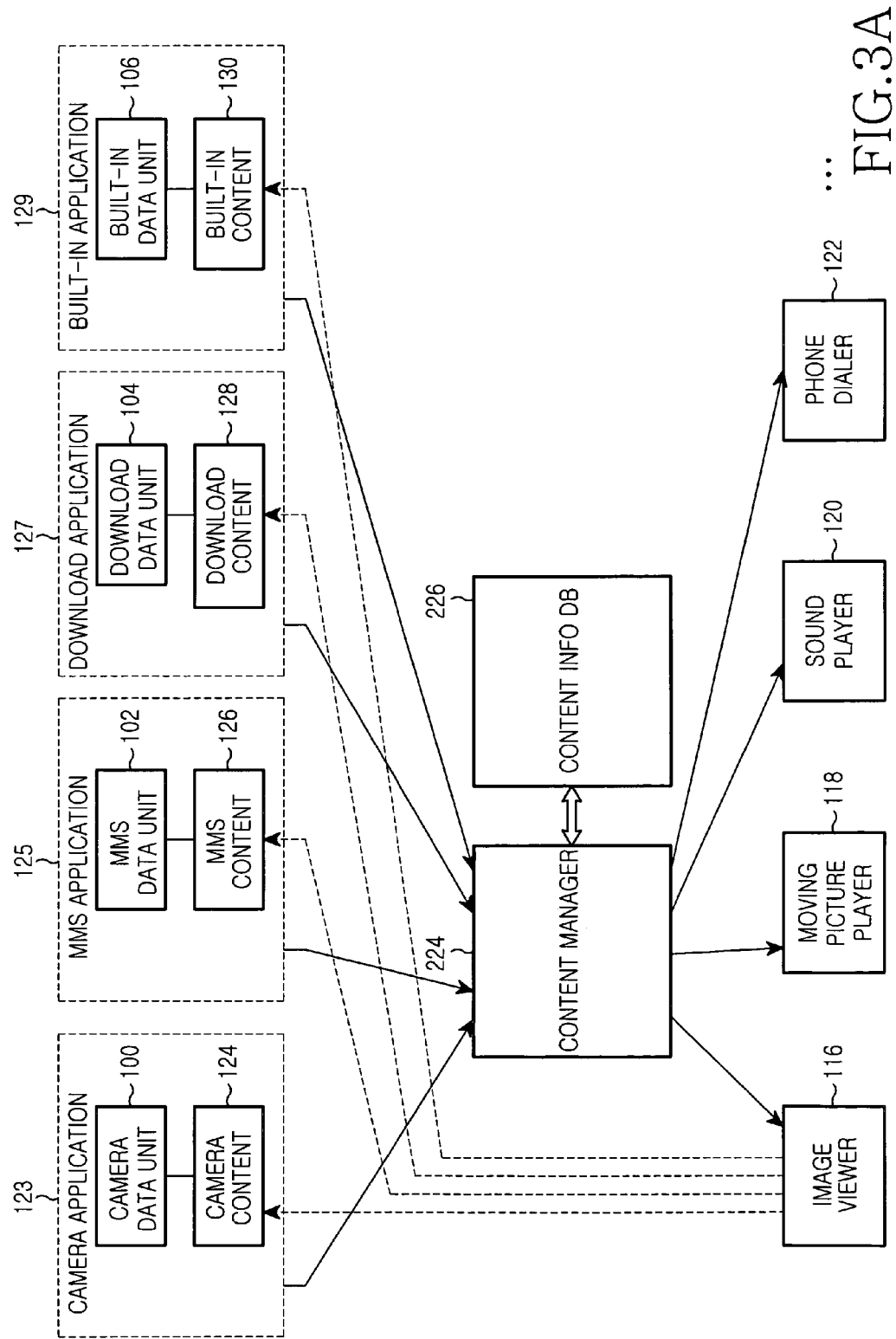

APPARATUS AND METHOD FOR MANAGING CONTENT DATA USING CONTENT DATA INFORMATION IN AN INFORMATION TERMINAL

PRIORITY

This application claims priority to an application entitled "Apparatus And Method For Managing Content Data Used In Information Terminal" filed in the Korean Intellectual Property Office on Oct. 18, 2004 and assigned Serial No. 2004-83207, the contents of which are incorporated herein by reference.

BACKGROUND OF THE INVENTION

1. Field of the Invention

The present invention relates to an information terminal, and more particularly to an apparatus and a method for managing content data in an information terminal.

2. Description of the Related Art

Typically, information terminals include not only mobile communication terminals, such as a PDA (Personal Data Assistant) and a smart phone, but also desk-top PCs (personal computers), and are also called "information processing terminals". According to the conventional content data management method for providing applications with content data required by the respective applications in such an information terminal, each application directly manages content data information generated by itself. That is, an application itself accesses a data storage unit to obtain information required by the application.

Herein, the "content data" means data utilized according to the user's intention by means of a relevant application according to the user's selection. Also, the "data storage unit" means a storage unit for storing new data generated from a data generation unit such as a camera. Such a data storage unit stores data ("content data") that can be used by applications in each data generation unit, and content data information, that contains the memory address for the content data (or a data generation unit), a type of data format, etc.

Therefore, in order for applications of a mobile communication terminal to read the requisite content data from memory, each application first obtains content data information indicating storage location and the like from a relevant data storage unit and then must search for necessary content data according to the obtained content data information. In general, conventional applications use different structures and formats, and independently make and use each content data information according to necessity.

Therefore, as the number of applications increases and/or as the methods of accessing data of these applications become more varied, content data management methods of providing content data to the applications become incompatible. Consequently, the internal construction of information terminals providing content data becomes more and more complicated, so that too much time is wasted in developing an information terminal and applications applicable to the information terminal.

SUMMARY OF THE INVENTION

Accordingly, the present invention has been made to solve the above-mentioned problems occurring in the prior art, and an object of the present invention is to provide an apparatus and a method for managing content data, that can simplify the internal construction of an information terminal for providing content data to applications of an information terminal, thereby easily providing the content data to each application.

To accomplish this object, in accordance with one aspect of the present invention, there is provided an apparatus for managing content data in an information terminal, the apparatus including: a data storage unit for storing the content data; a content information DB (database) for storing content data information corresponding to the content data stored in the data storage unit; and a content manager for receiving a request message for specific content data information from an application of the information terminal, and for providing content-information-DB index information of content data information in response to the request message.

In accordance with another aspect of the present invention, there is provided a method for managing content data in an information terminal, the method including: storing content data information of the content data in a content information DB (database) included in the information terminal; receiving a request message for specific content data of the content data from an application of the information terminal; searching the content information DB for specific content data information according to the reception of the request message; and providing specific content-information-DB index information of the searched content data information in response to the request message.

BRIEF DESCRIPTION OF THE DRAWINGS

The above and other objects, features and advantages of the present invention will be more apparent from the following detailed description taken in conjunction with the accompanying drawings, in which:

FIG. 3A is a block diagram illustrating a content data provision method in the mobile communication terminal of FIG. 2;

DETAILED DESCRIPTION OF THE PREFERRED EMBODIMENT

Hereinafter, preferred embodiments of an apparatus and a method for managing content data used in an information terminal according to the present invention will be described with reference to the accompanying drawings. In the following description of the present invention, a detailed description of known functions and configurations incorporated herein will be omitted when it may obscure the subject matter of the present invention. For convenience of description, the following description will be given with respect to a mobile communication terminal as an example, while the present invention relates to information terminals including mobile communication terminals and desk-top PCs (personal computers).

Figure 1:
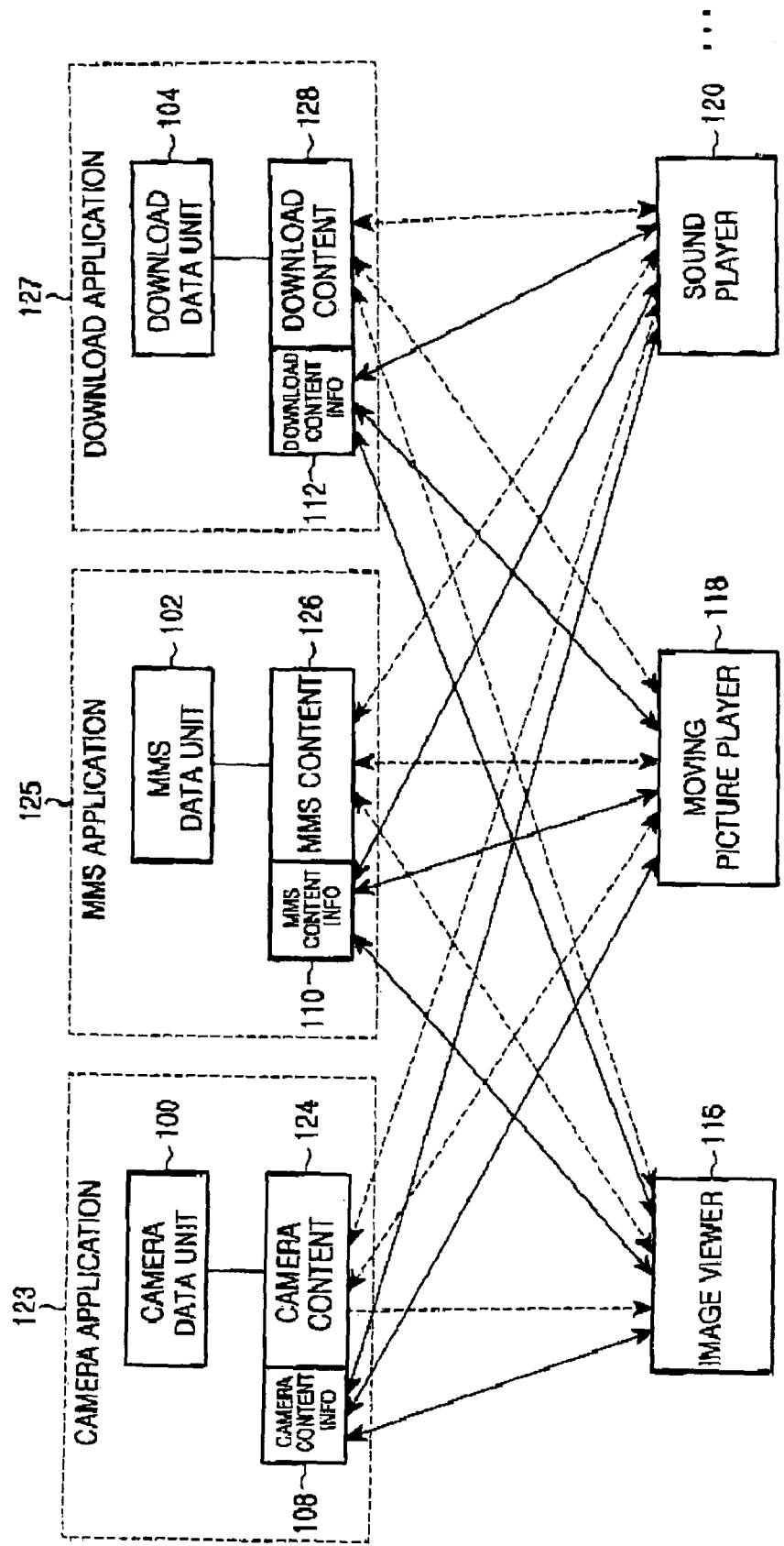
FIG. 1 is a block diagram illustrating a method of providing applications with content data in a typical mobile communication terminal.

FIG. 1 is a block diagram illustrating a method of providing applications with content data in a typical mobile communication terminal. The mobile communication terminal contains data storage units, which include a camera data unit 100 for generating data of an image photographed by a camera module of the mobile communication terminal and for storing the generated data, a multimedia message service ("MMS") data unit 102 for storing MMS message data received by an MMS, and a download data unit 104 for storing data downloaded by a user through a wireless data network and the like.

In addition, the mobile communication terminal contains applications, which include an image viewer 116 for reading image data of a designated format and for displaying the read image data as a visual image for a user through a display unit of the mobile communication terminal, a moving picture player 118 for reading moving picture data and for reproducing the read moving picture data, and a sound player 120 for reading data of sound file formats such as MP3, MID (Musical Instrument Digital Interface), etc. and for outputting read data through a speaker.

The respective applications are provided with content data information, which includes information relating to storage location of content data required by each application or the like, from the data storage units 100, 102 and 104 in order to obtain the content data. Herein, the "content data information" may be simple text information such as a title or an item of a list and may include image data (such as an icon or a thumbnail) representing an entire image. Also, in a more complicated case, the "content data information" may include information relating to DRM (Digital Rights Management), information relating to its connection to other application data, etc.

For instance, when a user selects the display of an image photographed by the camera of the mobile communication terminal, the image viewer 116 accesses the camera data unit 100 and reads camera content data information 108 stored in the camera data unit 100. Herein, the "camera content data information 108" corresponds to each of camera data stored in the camera data unit 100, and represents general information (e.g., a storage location, a format type, a data size, etc.) of relevant camera data. Also, the "camera data" represents content data stored by the camera data unit 100, which include both of image data and moving picture data stored by the camera of the mobile communication terminal.

Then, the image viewer 116 searches for camera content data selected by the user, from among camera content data information stored in the camera data unit 100. Next, the image viewer 116 reads camera content data information 108 corresponding to the camera content data, reads camera content data 124 according to the camera content data information 108 from the memory of the mobile communication terminal, and displays the read camera content data 124 through a display unit such as a LCD (Liquid Crystal Display).

Such a procedure is identically applied to the cases in which the moving picture player 118 or the sound player 120 reads data stored in the MMS data unit 102 or the download data unit 104. For example, the download data unit 104 stores content data, such as image data, moving picture data, or sound data downloaded by a user, and content data information corresponding to the respective content data. The content data information 112 includes content data information which corresponds to each of the content data stored in the download data unit 104, that is, information about whether the respective content data are image data, moving picture data or sound data. The applications provide the user with downloaded content data selected by the user from among downloaded content data 128 stored in the download data unit 104, using such downloaded content data information 112. The MMS data unit 102 also has the same function as the download data unit 104. That is, the applications 116, 118 and 120 search for MMS content data 126 which each application needs and can be provided with the MMS content data 126, using MMS content data information 110 stored in the MMS data unit 102.

As described above, in a typical mobile communication terminal, the respective applications 116, 118 and 120 can provide content data selected by a user to the user by using content data information stored in each of the data storage units 100, 102 and 104. However, in the typical mobile communication terminal, since each application independently accesses the respective data storage units, the internal construction of the mobile communication terminal is complicated. Therefore, a mobile communication terminal according to the present invention includes a content management unit capable of managing content data information stored in the respective data storage units to simplify the internal construction of the mobile communication terminal.

Figure 2:
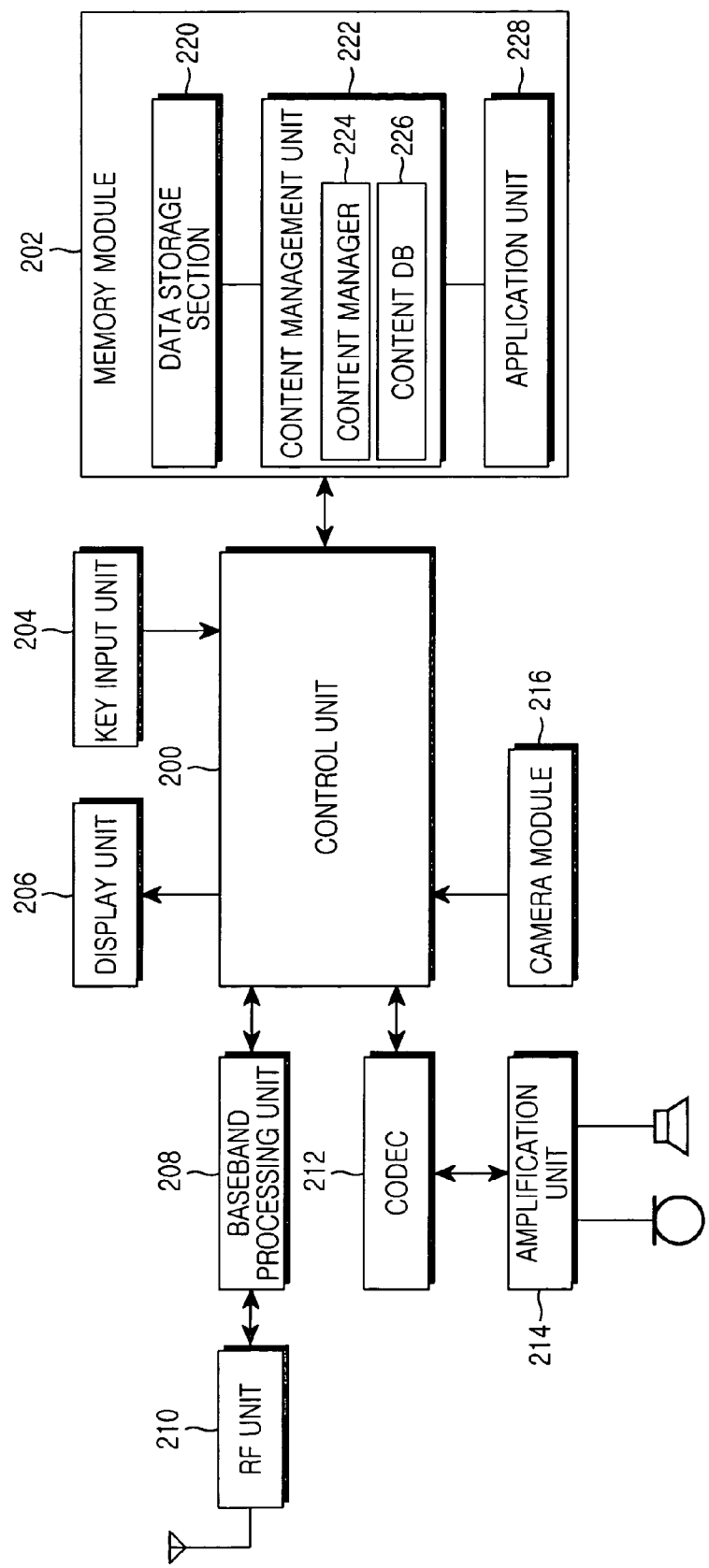
FIG. 2 is a block diagram illustrating a mobile communication terminal according to an embodiment of the present invention.

FIG. 2 is a block diagram illustrating a mobile communication terminal according to an embodiment of the present invention. The mobile communication terminal includes a memory module 202, a key input unit 204, a display unit 206, an RF (Radio Frequency) unit 210, a baseband processing unit 208, a CODEC (Coder-Decoder) 212 and a camera module 216, which are connected to a control unit 200. The control unit 200 processes a voice signal and data according to protocols for phone communication, data communication and wireless internet access and controls the respective elements of the mobile communication terminal. In addition, the control unit 200 controls a content manager 224 of a content management unit 222 so that the content manager 224 may provide information relating to the respective content data, which are stored in the respective data storage units of a data storage section 220, to the respective applications stored in an application unit 228.

The memory module 202 connected to the control unit 200 is constructed with a ROM (Read Only Memory), RAM (Random Access Memory) and a flash memory, stores reference data and programs for the processing and control of the control unit 200, and includes the application unit 228 in which various applications. Also, as described with reference to in FIG. 1, the data storage section 220 of the mobile communication terminal includes data storage units (such as the camera data unit 100, the MMS data unit 102 and the download data unit 104) for the respective data generation units. Also, the mobile communication terminal contains the content management unit 222, which includes the content manager 224 and a content information DB 226 storing reference data for the content manager 224.

The key input unit 204 contains various keys including number keys and transfers a key input performed by a user to the control unit 200. The display unit 206 includes a LCD (Liquid Crystal Display) and displays various information as images according to the control of the control unit 200. The RF unit 210 transmits/receives RF signals to/from a base station through an antenna 208. That is, the RF unit 210 converts a received signal into an IF (Intermediate Frequency) signal and outputs the IF signal to the baseband processing unit 208, and converts an IF signal input from the baseband processing unit 208 into an RF signal and transmits the RF signal through the antenna.

The baseband processing unit 208 is a baseband analog ASIC providing interface between the control unit 200 and the RF unit 210. That is, the baseband processing unit 208 converts a digital signal of a baseband input from the control unit 200 into an analog IF signal and transmits the analog IF signal to the RF unit 210, and converts an analog IF signal input from the RF unit 210 into a digital signal of a baseband and transmits the digital signal to the control unit 200. The CODEC 212 connected to the control unit 200 is connected to a microphone and a speaker through an amplification unit 214. The CODEC 212 performs PCM (Pulse Code Modulation) encoding with respect to a voice signal input from the microphone, thereby outputting voice data to the control unit 200, and performs PCM decoding with respect to voice data input from the control unit 200, thereby outputting the decoded voice data through the amplification unit 214 to the speaker. The amplification unit 214 amplifies a voice signal input from the microphone and a voice signal to be output to the speaker, while adjusting the volume of the speaker and the gain of the microphone under control of the control unit 200. The camera module 216 connected to the control unit 200 includes a miniature camera for a mobile communication terminal. The camera module 216 photographs an image or a moving picture according to the control of the control unit 200, digitizes the photographed image or moving picture, and stores digital data in the data storage section 220 of the memory module 202.

According to an embodiment of the present invention, since the mobile communication terminal includes the content management unit 222 having the content manager 224 and the content information DB 226 as shown in FIG. 2, it is possible for the content manager 224 to search for content data information and delivers necessary content data to the relevant application differently from a typical prior art mobile communication terminal where the respective applications directly access a data storage unit to obtain content data information.

Figure 3B:
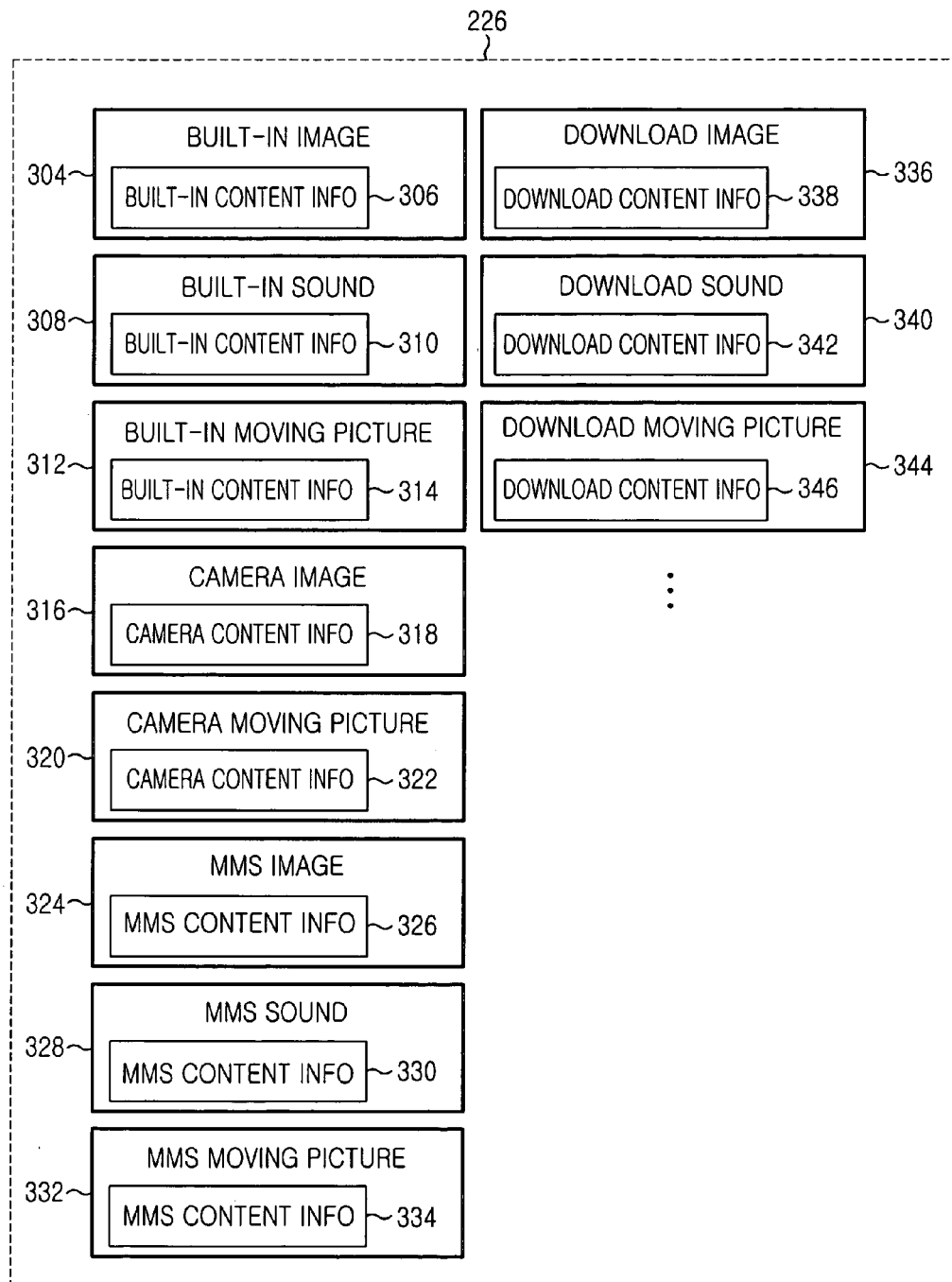
FIG. 3B illustrates an example of the content information DB storing content data information in the mobile communication terminal of FIG. 2.

FIGS. 3A and 3B explain the procedure for receiving content data information from applications and for providing the content data information from the content information DB in a mobile communication terminal according to an embodiment of the present invention. FIG. 3A is a block diagram illustrating an operation flow of the mobile communication terminal and FIG. 3B shows an example of the content information DB storing content data information in the mobile communication terminal.

First, referring to FIG. 3A, when new content data is generated in a data storage unit (such as a camera data unit 100, an MMS data unit 102, a download data unit 104 or a built-in data unit 106), corresponding content data information is stored in the content information DB 226 by the corresponding application which may include a camera application unit 123, an MMS application unit 125, a download application unit 127 and a built-in application unit 129. The content information DB 226 stores the respective content data information while classifying the respective content data information into categories such as "Built-In (image)" 304, "Built-in (sound)" 306, etc. Table 1 below represents an example of categories included in the content information DB 226.

TABLE 1

| CATEGORY INDEX | CATEGORY TITLE | DATA FORMAT TYPE | DATA GENERATION UNIT |
| --- | --- | --- | --- |
| 0100 | Built-In (image) | BMP, GIF | Built-In |
| 0200 | Built-In (sound) | WAV, MID | Built-In |
| 0300 | Built-In (moving picture) | AVI, MPG | Built-In |
| 0400 | Download (image) | BMP, JPG | Download |
| 0500 | Download (sound) | MP3, WAV | Download |
| 0600 | Download (moving picture) | MPG, AVI | Download |
| . | . | . | . |
| . | . | . | . |

Referring to Table 1, the content information DB 226 may include categories according to data format types, application units 123, 125, 127 and 129 and data storage units. For instance, when storage of new image data having a BMP (bitmap) data format type is completed in the download data unit 104, the download application unit 127 stores information relating to the new image data in the download (image) category from among categories of the content information DB 226.

When a request signal requesting content data stored in the data generation application units 123, 125, 127 and 129 is generated from one of service provision application units 116, 118, 120 and 122 for providing service to a user, the request signal is input to the content manager 224. The request signal contains category information including content data information requested by the relevant service provision application unit. Then, the content manager 224 searches for a category corresponding to the request signal in the content information DB 226, and provides content-information-DB index information of content data information, which is included in the searched category, to the service provision application unit outputting the request signal.

The content-information-DB index information includes a specific index of a category corresponding to the request signal and specific index information of content data information included in the category. Content data information corresponding to the content-information-DB index information is read from the content information DB 226 and then displayed for the user as a thumbnail, an icon or a list. When the user selects any one from among the displayed content data information, a relevant service provision application unit provides the user with content data corresponding to the selected content data information.

FIG. 3B shows an example of the content information DB 226 storing the content data. The content information DB 226 includes a plurality of categories which store the respective content data. The categories shown in FIG. 3B include "Built-in Image" 304, "Built-in Sound" 308, "Built-in Moving Picture" 312, "Camera Image 316, "Camera Moving Picture" 320, "MMS Image" 324, "MMS Sound" 328, "MMS Moving Picture" 332, "Download Image" 336, "Download Sound" 340 and "Download Moving Picture" 344. Of course, it is possible that the categories stored in the content information DB 226 may include more kinds of categories data generation applications of the mobile communication terminal.

In further detail, the "Built-in Image" category 304 stores content data information 306 corresponding to built-in image content data stored in the built-in application unit 129; the "Built-in Sound" category 308 stores content data information 310 corresponding to built-in sound content data which are stored in the built-in application unit 129, the "Built-in Moving Picture" category 312 stores content data information 314 corresponding to built-in moving-picture content data stored in the built-in application unit 129; the "Camera Image" category 316 stores content information 318 corresponding to camera image content stored in the camera application unit 123; the "Camera Moving Picture" category 320 stores content information 322 corresponding to camera moving-picture content stored in the camera application unit 123; the "MMS Image" category 324 stores content data information 326 corresponding to MMS image content data stored in the MMS application unit 125; the "MMS Sound" category 328 stores content data information 330 corresponding to MMS sound content data stored in the MMS application unit 125; the "MMS Moving Picture" category 332 stores content data information 334 corresponding to MMS moving-picture content data stored in the MMS application unit 125; the "Download Image" category 336 stores content data information 338 corresponding to download image content data stored in the download application unit 127; the "Download Sound" category 340 stores content data information 342 corresponding to download sound content data stored in the download application unit 127; and, the "Download Moving Picture" category 344 stores content data information 346 corresponding to download moving-picture content data which are stored in the download application unit 127.

Table 2 below shows an example content data stored in the "Download Image" category 336 of the above-mentioned categories.

mation corresponding to the request, and provides the requested content data information to the requesting application.

For example, when a user selects a key function to instruct the display of image data stored in the camera data unit 100, the image viewer 116 accesses the content manager 224 and requests content data information for content data desired by the image viewer 116 itself. In this case, a message for requesting the content data information from the image viewer 116 to the content manager 224 includes information relating to a category of the content data according to the user's selection.

When the content manager 224 receives such a request from the image viewer 116, the content manager 224 provides the application with content data information included in the requested category from among information contained in the content information DB 226. Then, the application having received the content data information, displays items of the received content data information as a thumbnail, an icon or a list on the display unit 206 of the mobile communication terminal.

Next, the application directly may read and display relevant content data on the basis of the content data information, or the relevant content data may be displayed by means of a display function of the content manager 224. When the user selects a displayed content data, the application provides the user with content data corresponding to the selected content data information. Consequently, the service provision

TABLE 2

| CONTENT INDEX | DATA FORMAT | STORAGE | DRM | SIZE | TITLE | STORAGE TYPE OF CONTENT | ADDED INFO |
|---|---|---|---|---|---|---|---|
| 0001 | BMP | download data unit | NO | 150 kB | Sunrise Wall Paper | File | — |
| 0002 | JPG | download data unit | NO | 220 kB | Snowy Night | File | — |
| 0003 | JPG | download data unit | NO | 300 kB | Scent of Summer Flower | File | — |
| 0004 | BMP | download data unit | NO | 100 kB | Waterfall Image | File | — |
| 0005 | JPG | download data unit | YES | 780 kB | Image of Miss Jeon | File | — |
| 0006 | BMP | download data unit | YES | 900 kB | Image of Mr. Bae | File | — |
| 0007 | JPG | download data unit | NO | 70 kB | Setting Sun at Sea | File | — |
| . | . | . | . | . | . | . | . |
| . | . | . | . | . | . | . | . |
| . | . | . | . | . | . | . | . |

As described above, Table 2 illustrates one category for content data information of downloaded images. "DRM (Digital Rights Management)" indicates whether or not copyright protection of relevant digital data exists. "Storage Type of Content" indicates the type of relevant content data stored. Relevant content may be stored as a normal file, as a DB file of a sheet type (such as a phone book to be used in an application like the phone dialer 122), or as a file type such as that of data stored in a ROM or a RAM. "Added Info" is a reserve item to represent some information other than the items shown in Table 2 relative to the content data information to be stored.

Therefore, information relating to content data stored in the respective data storage units 100, 102, 104 and 106 (i.e., information about a format type of stored content data, a storage location of the content data, whether or not copyrights exist, size of the content data, a title of the content data and storage type of the content data) is stored in the content information DB 226 according to each category. When the content manager 224 receives a request signal for content data information from one of the service provision application units 116, 118, 120 and 122, the content manager 224 searches the content information DB 226 for category information.

applications can obtain content data information about necessary content data by providing the content manager 224 with category information about content data information selected by a user, without directly accessing the data generation applications to search for the content data information about the necessary content data.

Figure 4:
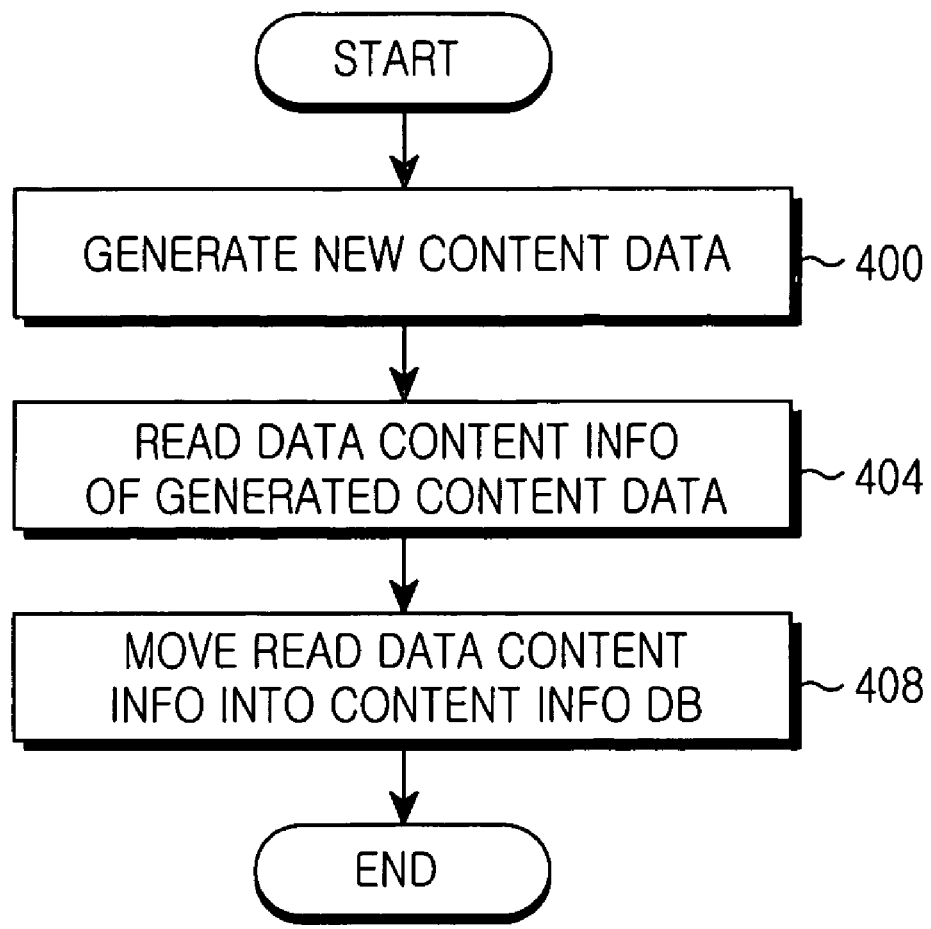
FIG. 4 is a flowchart for illustrating an operation of an application when a content manager having a content information DB is included in a mobile communication terminal according to an embodiment of the present invention.

FIG. 4 is a flowchart for illustrating an operation of an application when a content manager having a content information DB is included in a mobile communication terminal according to an embodiment of the present invention. When new content data is generated in the data storage section 220 in step 400, the application reads content data information about the newly-generated content data from the data storage section 220 in step 404. When the reading of the content data information is completed, the application proceeds to step 408. In step 408, the application moves and stores the content data information, that is read in step 404, in a category of the content information DB which corresponds to the newly-generated content data.

Therefore, content data information, which was stored in the data generation units 100, 102, 104 and 106 included in the data generation application units 123, 125, 127 and 129, is stored in the content information DB 226 according to an embodiment of the present invention. FIG. 4 shows the operation only when new content data are generated in the data storage section. The content data information corresponding to deleted content data is simultaneously deleted from the content information DB 226 simultaneously when the content data is deleted from the data generation units 100, 102, 104 and 106.

Figure 5:
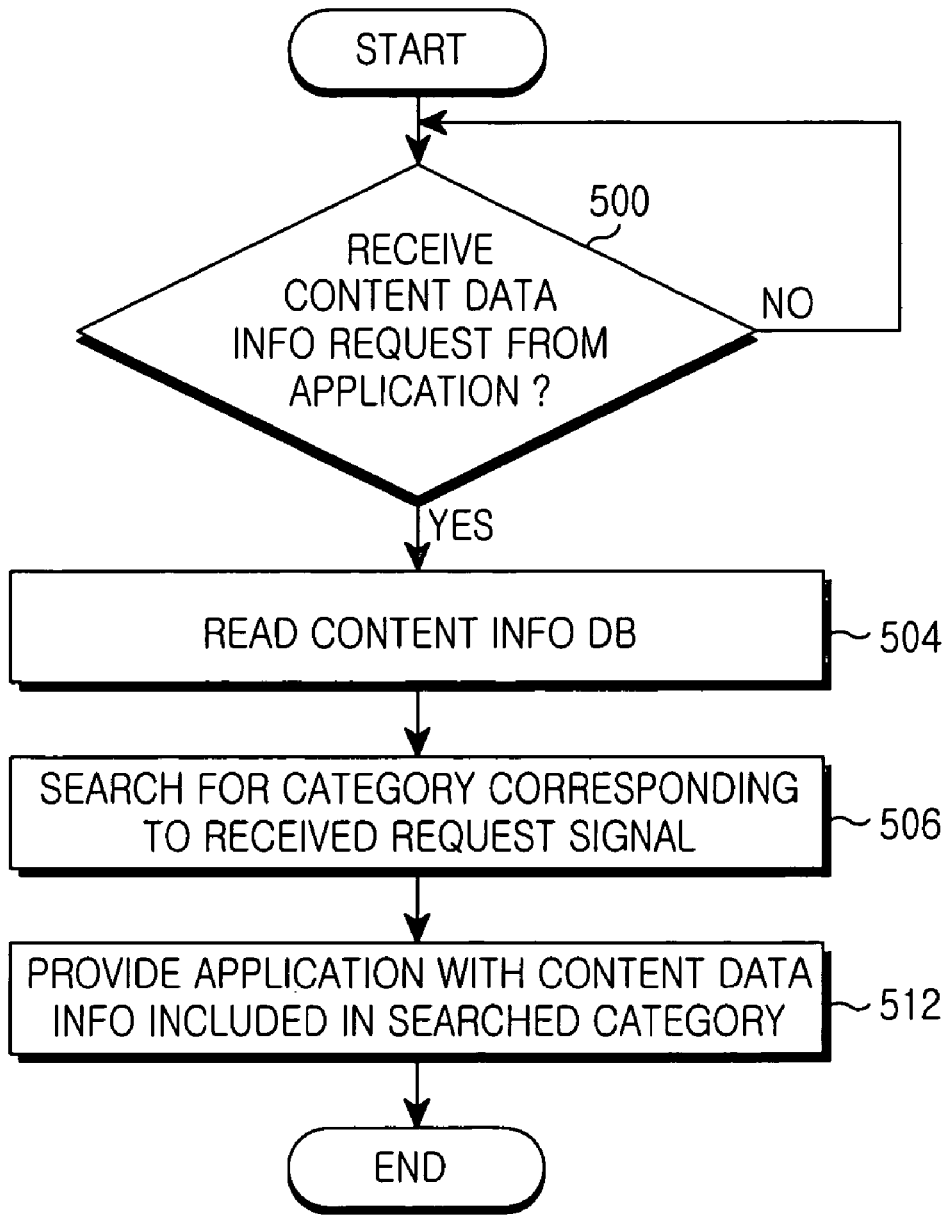
FIG. 5 is a flowchart illustrating an operation of providing index information of content data information using a content manager according to an embodiment of the present invention.

FIG. 5 is a flowchart illustrating an operation of providing index information of content data information using a content manager according to an embodiment of the present invention. When a request message for content data is generated from an application in step 500, the content manager 224 receives the request message. The request message generated from an application includes information relating to a category of the content data requested from the application. For instance, when a user wants to display camera image content data stored in the camera application unit 123, the image viewer 116 selected by the user inputs a request signal of requesting the image content data selected by the user to the content manager 224. The request signal includes the category for the image content data and index information indicating the image content data location in the relevant category.

When the content manager 224 receives the request signal, the content manager 224 proceeds to step 504 of reading the content information DB 226. In step 506, the content manager 224 searches the read content information DB 226 for the category corresponding to the request signal received in step 500. Then, the content manager 224 provides index information relating to content data information, which is included in the category found from the searched content information DB 226, to the relevant application in step 512. The index information includes the category index shown in Table 1 and the content index shown in Table 2. For instance, the index information may be represented as shown in Equation 1 below.

$$\text{Index Information} = (\text{Category Index Information}) + (\text{Content Index Information}) \quad \text{Equation 1}$$

In this case, when the user selects the display of downloaded image data of 'Sunrise Wall Paper' in Tables 1 and 2, the image viewer 116 inputs information relating to the download image category 336 as a content data request signal to the content manager 224. Then, the content manager 224 provides index information of the download image category 336 and index information of content data stored in the category 336, in response to the request signal. For example, the index information provided according to Tables 1 and 2 and Equation 1 may include "0401 Sunrise Wall Paper", "0402 Snowy Night" and "0403 Scent of Summer Flower".

The user selects desired content data information from among the displayed content data information, the image viewer 116 reads content data corresponding to the content data information selected by the user from the download data unit 104, and displays the read content data on the display unit 202. As described above, in the mobile communication terminal according to an embodiment of the present invention, it is not necessary that the respective applications directly access the data storage section in order to obtain content data information relating to content data wanted by each application. That is, when an application inputs only category information relating to content data, which is requested for the content manager 224, the application is provided with index information of content data information corresponding to the relevant content data, and is provided with content data information corresponding to the index information from among information stored in the content information DB 226. Consequently, in the mobile communication terminal of the present invention, it is not necessary to directly access the data generation application units 123, 125, 127 and 129 in order to obtain content data information.

Figure 6:
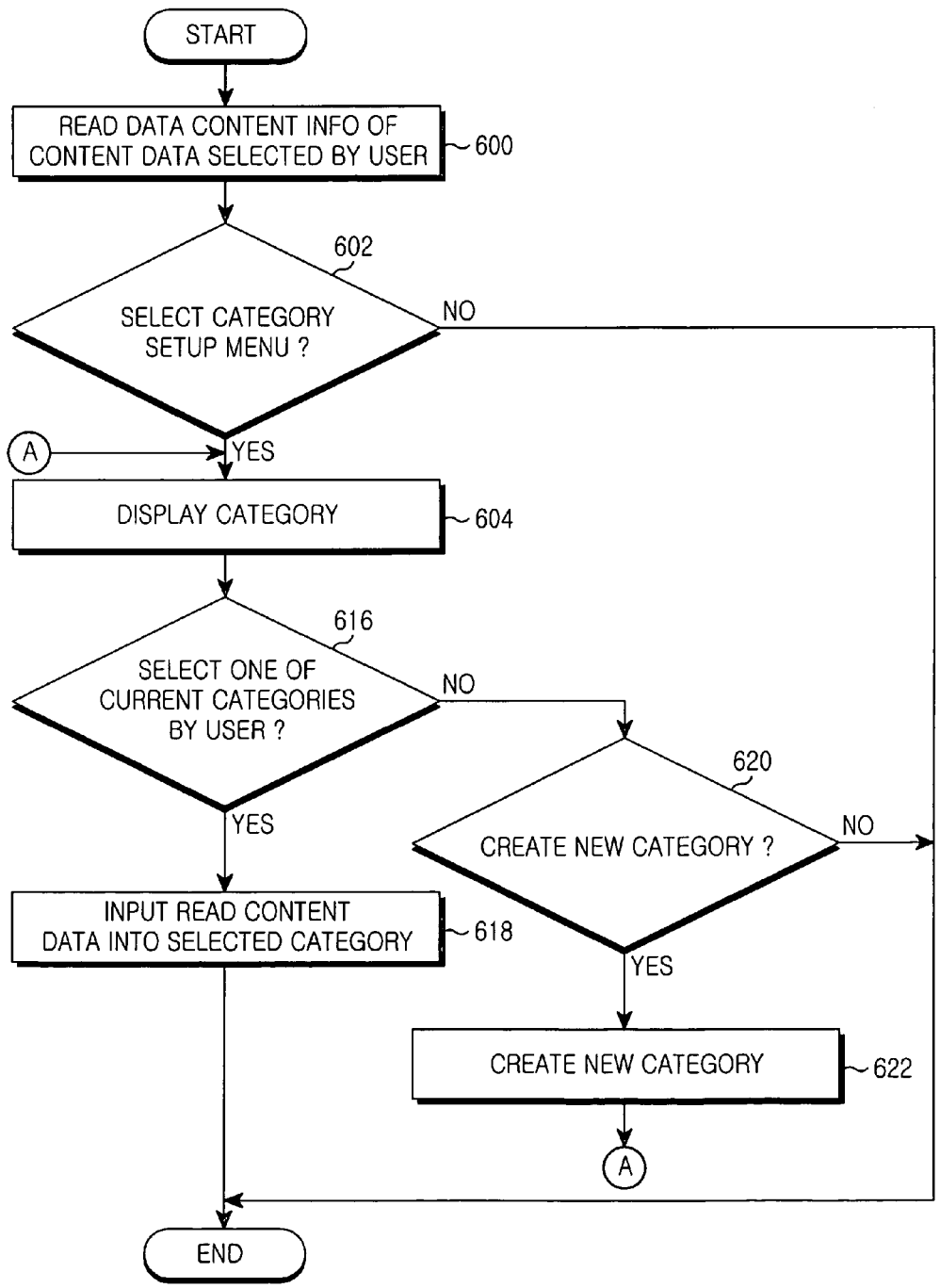
FIG. 6 is a flowchart illustrating an operation of inputting content data information selected by a user into a specific category in the mobile communication terminal according to an embodiment of the present invention.

FIG. 6 is a flowchart illustrating an operation of moving content data stored in the content information DB 226 from a current category to another category, and of creating a new category for specific content data according to the selection of a user. When a user selects specific content data stored in the content information DB 226 in step 600, the control unit 200 checks whether or not a category setup menu is selected by the user in step 602. When the user does not select the category setup menu, the control unit 200 ends the operation. If the user does select the category setup menu in step 602, the control unit 200 proceeds to step 604 of displaying current categories of the content information DB 226 on the display unit 206. In step 616, the control unit 200 checks whether or not the user selects one of the categories currently-displayed on the display unit 206. If the user selects one of the categories, the control unit 200 proceeds to step 618, to input the content data information read in step 600 into the category selected by the user, thereby ending the operation.

If, however, the user does not select any one of the currently-displayed categories in step 616, the control unit 200 proceeds to step 620, where the control unit 200 checks whether or not the user selects a new category creation menu. If the user does select the new category creation menu in step 620, the control unit 200 proceeds to step 622 of creating a new category. Then, the control unit 200 stores index information of the newly-created category in the content information DB 226. Table 3 below shows an example of content data information stored in a category newly-created according to the user's selection.

TABLE 3

| CONTENT INDEX | DATA FORMAT | STORAGE | DRM | SIZE | TITLE | STORAGE TYPE OF CONTENT | ADDED INFO |
|---|---|---|---|---|---|---|---|
| 0001 | WAV | ROM | NO | 200 kB | Train Sound | File | — |
| 0002 | WAV | ROM | NO | 220 kB | BirdsChirping | File | — |
| 0003 | MID | MMS data unit | NO | 150 kB | MMS reception Data | File | — |
| 0004 | AVI | download data unit | YES | 3.2 MB | Rain's Music Video | File | — |
| 0005 | MP3 | download data unit | YES | 1.5 MB | Lovers in Paris | File | — |
| . | . | . | . | . | . | . | . |
| . | . | . | . | . | . | . | . |

Table 3 shows an example in which a user creates a new category named "Cheerful Beep Sound" and inputs content data information selected by the user into the new category. In the new category of "Cheerful Beep Sound", it can be understood that content indexes of "0001" and "0002" store content data information relating to content data stored in the built-in data unit 106, a content index of "0003" stores content data information relating to content data stored in the MMS data unit 102, and content indexes of "0004" and "0005" store content data information relating to content data stored in the download data unit 104, by the selection of the user.

When a procedure of inputting content data information into the new category as shown in Table 3 is completed, the control unit 200 returns to step 604, in which control unit 200 displays all categories including the newly-created category. Then, the control unit 200 proceeds to step 616 of checking whether or not the user selects one of currently-displayed categories. As described above, the user can input specific content data information selected by the user either into a specific category or into a new category. While the above description with reference to FIG. 6 is directed with respect to the case in which a user first selects specific data and then selects the category setup menu, it should be noted that the user may select the category setup menu before selecting the specific data.

Figure 7C:
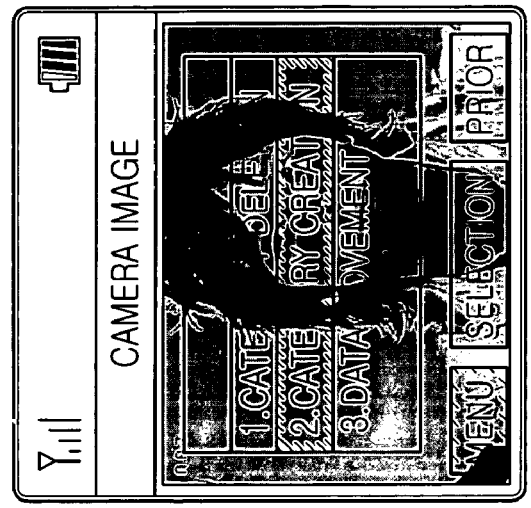
FIGS. 7A to 7F are examples of screens displayed on the display unit during a procedure of creating a new category according to an embodiment of the present invention.
Figure 7B:
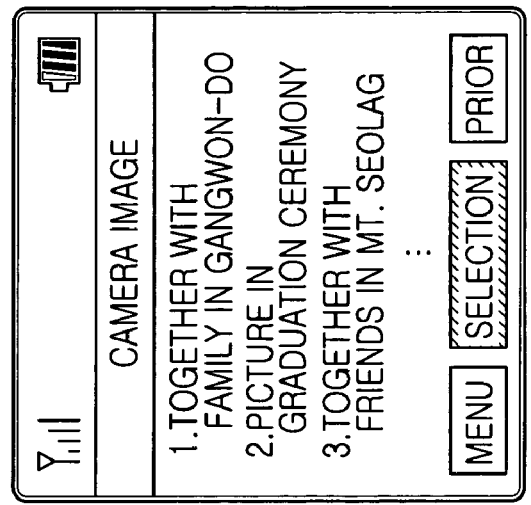
Figure 7A:
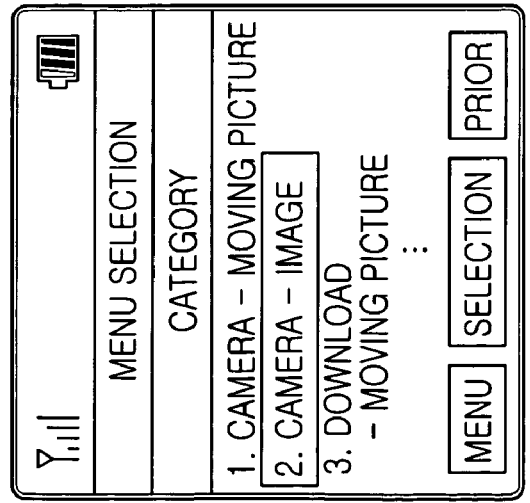

FIGS. 7A to 7F are views for showing examples of screens displayed on the display unit 206 during a procedure of selecting the setup of a new category and creating the new category by a user, from among the procedure described with reference to FIG. 6. FIGS. 7A and 7B illustrate screens against which a user selects a "Camera-Image" category from among currently-set categories and then selects one of content data information relating to camera image data, which is stored in the selected category. When content data information is selected through such a procedure, the image viewer 116 accesses the camera application unit 123 to display image content data corresponding to the selected content data information on the display unit 206. FIG. 7C illustrates a screen of the display unit 206 on which content data selected by the user is displayed.

Figure 7F:

Referring to FIG. 7C, it can be understood that the content data information corresponding to the current-displayed content data is included in the "Camera-Image" category. Also, FIG. 7C shows a state in which the user selects a new category creation menu in order to create a new category and to move the image content data selected by the user into the newly-created category. When the user selects the new category creation menu as described above, the control unit 200 receives information relating to a category to be newly created from the user. FIG. 7D illustrates a screen on which the user inputs information (i.e., Friend Album) relating to the category to be newly created.

Figure 7E:
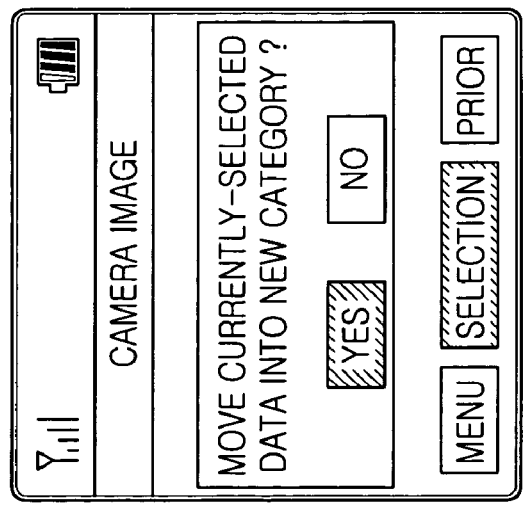
Figure 7D:
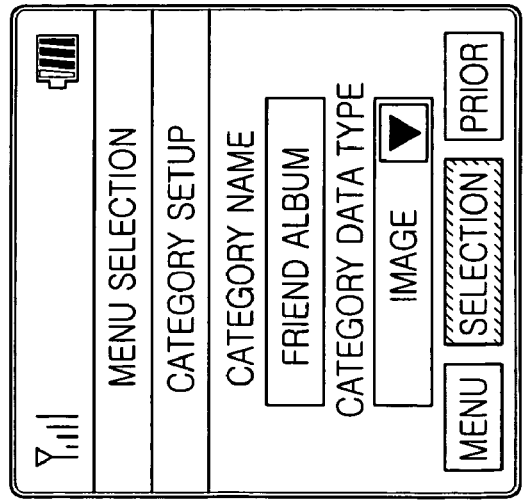

When the input of information relating to the category to be newly created is finished as shown in FIG. 7D, the control unit 200 checks whether or not it is wanted by the user that the information relating to currently-selected content data moves into the newly-created category as shown in FIG. 7E. When the user selects that the information relating to currently-selected content data moves into the newly-created category, the control unit 200 moves the content data information relating to currently-selected content data into the newly-created category as described with reference to FIG. 6. Therefore, content data information selected by the user as described with reference to FIGS. 7A and 7B moves into the "Friend Album" category newly-created by the user as shown in FIG. 7F, and the image viewer 116 is provided with content data information not from the "Camera Image" category but from the new-created "Friend Album" category to display the content data.

As described above, in the mobile communication terminal according to an embodiment of the present invention, content data information corresponding to each content data is stored according to its category in a content information DB. Also, whenever an application requests content data information, the content manager provides the application with index information of content data. Then, the application accesses the content information DB and reads content data information corresponding to the provided index information. Therefore, the internal construction of the mobile communication terminal for providing content data to the applications of the mobile communication terminal is simplified, thereby reducing development time for the mobile communication terminal and its corresponding applications. In addition, since the respective applications consign information management of content created by each application to the content manager, the construction of each application is simplified. Also, since each application can easily share information with other applications through the content manager, a data sharing structure in the whole mobile communication terminal is simplified. Consequently, it is possible to remarkably reduce the development time for applications of the mobile communication terminal.

While the present invention has been shown and described with reference to certain preferred embodiments thereof, it will be understood by those skilled in the art that various changes in form and details may be made therein without departing from the spirit and scope of the invention as defined by the appended claims. Particularly, while the embodiments of the present invention are described with respect to a mobile communication terminal, the present invention can be applied to all information terminals including desk top PCs as well as mobile communication terminals. In addition, while the embodiments of the present invention are described with respect to the camera data unit, the MMS data unit, the download data unit and the built-in data unit as examples of data storage units, the present invention may include other data storage units. Further, while the embodiments of the present invention are described with respect to the image viewer, the moving-picture player, the sound player and the phone dialer as examples of applications, such examples are selected only for convenience of description, the present invention may employ different applications. Accordingly, the scope of the invention is not to be limited by the above embodiments but by the claims and the equivalents thereof.

What is claimed is:

1. An apparatus for managing application-specific content data in an information terminal, the apparatus comprising:
a control unit in the information terminal; and
a memory module in the information terminal, the memory module comprising:
a plurality of data storage units for storing the application-specific content data, wherein each of the plurality of data storage units stores application-specific content data provided by a different one of a plurality of data generation applications;
a content information database (DB) for storing only content data information corresponding to the application-specific content data according to a plurality of categories being set according to at least one of an application type, a data format type and a data storage location type; and
a content manager for receiving a request message for specific content data information from an application of the information terminal, for searching a category corresponding to the request message in the content information DB and for providing content-information-DB index information of the content data information, which is generated by combining an index number of the searched category with an index number of the content data information stored in the searched category, in response to the request message, whereby the application can obtain content data information about the application-specific content data corresponding to the request message without directly accessing at least one of the plurality of data storage units of the plurality of data generation applications to search for the application-specific content data;

wherein, when the user selects a category, a list of content data stored in the selected category is displayed so as to enable the user to select one of the displayed content data, and index information of content data selected by the user is provided.

2. The apparatus as claimed in claim 1, wherein the content data information is stored according to categories, the categories being set according to applications or services.

3. The apparatus as claimed in claim 1, wherein the content data information is stored according to categories, the categories being set according to data format information.

4. The apparatus as claimed in claim 1, wherein the content data information is stored according to categories, the categories being set according to data storage location information.

5. The apparatus as claimed in claim 2, wherein the request message includes information relating to the category.

6. The apparatus as claimed in claim 3, wherein the request message includes information relating to the category.

7. The apparatus as claim in claim 4, wherein the request message includes information relating to the category.

8. A method for managing application-specific content data in an information terminal, the method comprising the steps of:

storing application-specific content data in a plurality of data storage units in the information terminal, wherein each of the plurality of data storage units stores application-specific content data provided by a different one of a plurality of data generation applications;

storing only content data information of the application-specific content data according to a plurality of categories being set according to at least one of an application type, a data format type and a data storage location type in a content information database DB in the information terminal;

receiving a request message for specific content data of the application-specific content data from an application of the information terminal;

searching the content information DB for a category corresponding to the request message; and providing specific content-information-DB index information of content data information, which is generated by combining an index number of the searched category with an index number of the content data information stored in the searched category, in response to the request message, whereby the application can obtain content data information about the application-specific content data corresponding to the request message without directly accessing at least one of the plurality of data storage units of the plurality of data generation applications to search for the application-specific content data;

wherein, when the user selects a category, a list of content data stored in the selected category is displayed so as to enable the user to select one of the displayed content data, and index information of content data selected by the user is provided.

9. The method as claimed in claim 8, wherein, in the content data information storage step, the content data information is stored according to categories, the categories being set according to applications or to services.

10. The method as claimed in claim 8, wherein, in the content data information storage step, the content data information is stored according to categories, the categories being set according to data format information of content data corresponding to the content data information.

11. The method as claimed in claim 8, wherein, in the content data information storage step, the content data information is stored according to categories, the categories being set according to data storage location information.

12. The method as claimed in claim 9, wherein the request message includes the category of the specific content data information.

13. The method as claimed in claim 10, wherein the request message includes the category of the specific content data information.

14. The method as claimed in claim 11, wherein the request message includes the category of the specific content data information.

15. The method as claimed in claim 8, wherein the search step comprises the steps of:

searching the content information DB for a category corresponding to category information included in the request message; and selecting specific content data information included in the searched category.

16. The method of claim 9, wherein the search step further comprises a step of selecting a specific category when a user wants to move content data information of specific content data into the specific category.

17. The method of claim 10, wherein the search step further comprises a step of selecting a specific category when a user wants to move content data information of specific content data into the specific category.

18. The method of claim 11, wherein the search step further comprises a step of selecting a specific category when a user wants to move content data information of specific content data into the specific category.

19. The method as claimed in claim 16, wherein the category selection step comprises:

reading content data information of content data selected by the user;

displaying categories of the content information DB;

selecting one of the displayed categories by the user; and inputting the read content data information into a category selected by the user.

20. The method as claimed in claim 19, wherein the category selection step further comprises the steps of:

checking whether the user selects creation of a new user category; and creating the user category.

21. The method as claimed in claim 20, wherein the user category creation step comprises the steps of:

receiving category information of the user category from the user; and creating the user category according to the received category information and storing the created user category in the content information DB.

22. The method as claimed in claim 8, wherein the list of content data has one of a thumbnail, an icon and a list item, which is corresponding to the content data.

23. The method as claimed in claim 22, wherein the list of a content data has one of a thumbnail, an icon and a list item, which is corresponding to the content data which can be selected by the user.

24. The method of claim 10, wherein the content data information storage step further comprises a step in which the content data information, which is classified and stored according to the categories, is further classified according to categories which are subdivided according to applications or services.

25. The method of claim 11, wherein the content data information storage step further comprises a step in which the content data information, which is classified and stored according to the categories, is further classified according to categories which are subdivided according to applications or services.

* * * * *